INVENTOR
HEINZ RIEMANN

United States Patent Office

3,545,246
Patented Dec. 8, 1970

3,545,246
EXTRUSION PRESS
Heinz Riemann, Duisburg, Germany, assignor to
Hydraulik G.m.b.H., Duisburg, Germany
Filed Jan. 26, 1968, Ser. No. 700,801
Claims priority, application Germany, Feb. 11, 1967,
H 61,824
Int. Cl. B21c *31/00*
U.S. Cl. 72—270          6 Claims

ABSTRACT OF THE DISCLOSURE

A continuously operating extrusion press particularly for the sheathing of cable includes a main piston which is movable in a feed bore of a receiver to force extrusion material through a passage which is closed by a valve, and to displace the valve and to cause the material to flow into a feed bore leading to a storage chamber which is partially defined within the receiver and partially within a power-driven holder. The power-driven holder provides a mounting for a mandrel through which an element such as a cable to be sheathed is passed. The storage zone communicates with a feed conduit defined in the power-driven holder which supplies the extrusion material in an annular path around the cable which is fed through the hollow mandrel so that the extruded material is formed over the cable as it is delivered through the mandrel. A feature of the construction is the provision of a hollow auxiliary stem which is floatingly held between the storage zone defined partially in the receiver and partially in the power-driven holder. During the movement of the main piston in the bore of the receiver the auxiliary stem is displaced away from the piston in the storage zone to push a partial quantity of the extrusion material ahead of it into the extrusion chamber surrounding the mandrel of the holder. By permitting the hollow auxiliary stem to float within the storage zone, it is possible to charge and discharge the quantity of extrusion material which comes from the valve chamber under optimum conditions of resistance and at the most favorable resistance conditions the power loss is the lowest. In addition, the floating arrangement of the auxiliary stem makes it easier to seal the storage area.

SUMMARY OF THE INVENTION

This invention relates in general to the construction of extrusion presses and in particular to a new and useful extrusion press, particularly a cable sheathing press in which the material being extruded is discharged through a valve-operated chamber into a storage chamber defined between two relatively movable parts which are interconnected by a movable hollow auxiliary stem which is slidable in the storage chamber.

The present invention is particularly applicable to the construction of a press of a type for supplying extrusion material for delivery through an annular extrusion chamber arranged at the discharge of a hollow mandrel through which a cable is passed in order to sheath the cable. With such devices it is usual to have a material being extruded delivered through a feed bore which communicates with a valve chamber which is closed by a valve which is opened during the movement of an extrusion piston through the bore. A machine of this nature is shown, for example, in U.S. Patents 3,203,216 and 3,224,240.

The present invention is an improvement over such devices, particularly in respect to the provision of a storage chamber located between the discharge of a valve chamber and the infeed to the extrusion chamber. In accordance with the invention, this storage chamber is formed partially within the infeed receiver and partially within a holder for a mandrel or forming part. The receiver and the holder are relatively movable toward and away from each other. The construction includes a hollow auxiliary stem in the form of a sleeve member which bridges the gap between the receiver and the holder when they are moved apart and which during the charging of the receiver will be displaced to push a quantity of extrusion material into the feed bore which was previously directed into the storage chamber by the movement of the main stem. The storage zone is chargeable and dischargeable by relative displacement of the tool holder relative to the receiver. The principal feature of the invention is the dividing of the storage zone into two partial zones which communicate through the hollow stem which is telescopic in respect to the partial zones defined in each of the receiver and the tool holder. The hollow auxiliary stem is provided with outwardly extending guide flanges at each end so that it is captured by the associated receiver and holder at respective opposite ends but may move freely within the bores defining the storage zones in each of these parts. Thus by the floating movement of the auxiliary stem, the storage zone is divided into a partial zone in front of and a partial zone behind the auxiliary stem, and the auxiliary stem is relatively movable therein so that it is possible to charge and discharge the quantity of extrusion material coming from the valve chamber under optimum conditions of resistance. At such optimum conditions of resistance, the power loss, of course, will be lowest.

The invention also provides another advantage over the known extruders. Because with the known devices the hollow auxiliary stem is firmly connected with the respective receiver and tool holder of the known extruders, the attachment of the auxiliary stem into one of the extruder parts and the packing of the joints against penetration of extrusion material at the zone of the attachment offer considerable difficulties. For even with the most careful sealing and the most favorable method of attachment, the extrusion material can, under high cyclically changing specific pressures, creep into the finest hair cracks and lead to bursting effects at the point of the sealing and attachment. With the inventive arrangement, however, the secure attachment of the auxiliary stem to the associated parts is not necessary so that sealing of the joints is avoided completely. In addition, the auxiliary stem according to the invention is as short as possible and hence of a sturdy design. The present construction also provides a storage and extrusion in the most optimum manner.

Accordingly, it is an object of the invention to provide an extrusion device in which the material being extruded is delivered into a storage chamber defined between the receiver for the extrusion material and a holder and in which a hollow auxiliary stem or sleeve member is slidable, the stem subdividing the storage chamber into two parts which are in communication through the bore of the stem.

A further object of the invention is to provide an extrusion press, particularly a cable sheathing press in which the extrusion material is injected into an extrusion chamber under optimum conditions of resistance and in which an auxiliary stem is floatingly arranged between two movable parts of the apparatus in a manner which requires no elaborate sealing of the parts and which permits storage and extrusion in an optimum space.

A further object of the invention is to provide an extrusion press which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION

Figure 1:
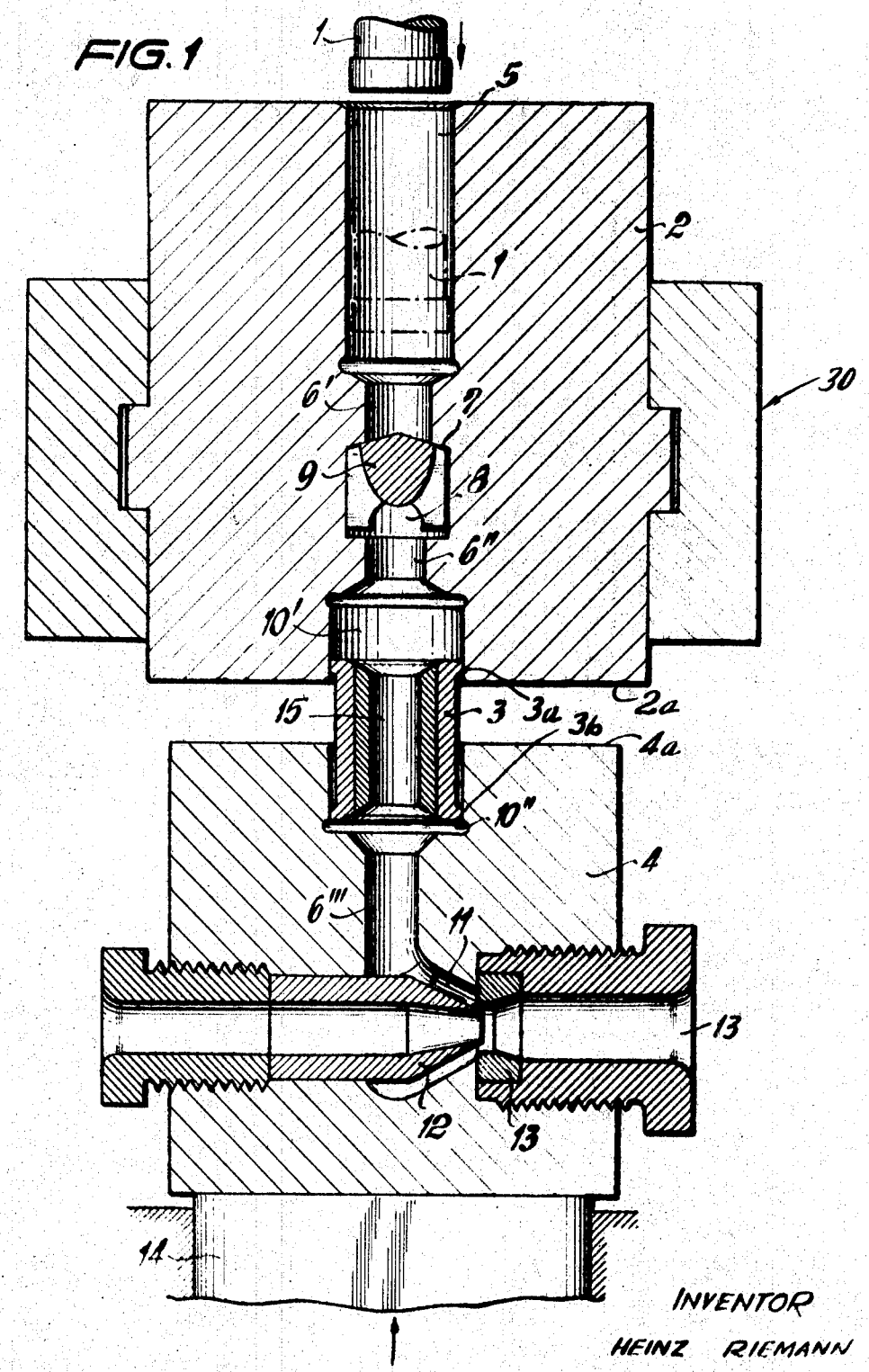
FIG. 1 is a partial transverse sectional view of a continuously operating cable sheathing extruder constructed in accordance with the invention.

Referring to the drawings in particular, the invention embodied therein comprises an extrusion press generally designated 30 which includes a power-driven main stem or piston 1 which is reciprocable into and out of a feed bore 5 of a receiver 2 for extruding material through a front feed bore 6′ and into a valve chamber 8 which is normally closed by a valve body 9. The valve body 9 is biased against a valve seat 7 defined as an annular lip at the juncture of the feed bore 6′ and the valve chamber 8.

When the piston 1 is moved from the solid line position to the dotted line position indicated in FIG. 1, the material is forced through the front feed bore 6′ and causes the valve 7 to move off its seat to permit the flow of material around the valve through the valve chamber 8 and into the feed bore 6″ and into a storage space 10′ defined in the lower end face 2a of the receiver 2.

In accordance with the invention, an additional storage space area 10″ is defined in an upper end face 4a of a power-driven tool holder 4. The tool holder 4 includes a vertical bore 6‴ constituting a rear feed channel which leads at its lower end to an annular extrusion chamber 11. A hollow mandrel 12 is positioned in a transverse bore which intersects the rear feed bore 6‴ and its forward or discharge end is oriented adjacent a matrix 13 having a bore 13a defined therethrough for the passage of a cable from the mandrel 12 after it has been ensheathed by material extruded through the annular extrusion chamber 11. The power-driven tool holder is moved by a tool holder drive 14 in directions toward and away from the receiver 2.

A feature of the inventive construction is that the storage zones 10′ and 10″ are connected through a bore 15 of a hollow auxiliary stem member 3 which is slidable in each storage zone 10′, 10″ but which is provided with widened flange portions or guide faces 3a, 3b at the respective ends thereof for permanently connecting and guiding the stem to each of the receiver 2 and the power driven holder 4. The stem 3 and the bores of the storage zones 10′ and 10″ are such that the stem will move in a floating manner between the two storage zones.

During operation in the first stage of the cycle, the auxiliary stem 3 and the tool holder 4 will be located in the lower starting position shown in the drawings. The piston 1 is reciprocated downwardly to the dotted line position. After the main stem 1 has reached the end position shown in broken lines the power-driven holder 4 is moved upwardly by the tool holder drive 14. Due to the upward movement of the holder 4, the pressure variation in the storage chambers 10′ and 10″ causes the valve element 9 to be pressed on its seat 7 so that the valve is closed. The material contained in the storage chambers 10′ and 10″ is then pressed by the same upward movement of the holder 4 through the hollow auxiliary stem 3 and into the chamber 11. As soon as this is completed, the main die 1 is moved upwardly again back into a top position and a new ingot can be inserted into the receiver bore 5. The holder 4 is then moved back into a starting position. In this manner, the partial quantity of extrusion material stored in the storage zone 10′ and in 10″ from the preceding extrusion is employed for closing the valve 9 in the valve chamber 8 and after this operation for the continuation of the extrusion operation.

Thereafter, the extrusion material is directed through the rear feed 6‴ and into the extrusion chamber 11 at a location between the shaping mandrel and matrix 13 where a cable sheath (not shown) is produced.

Because of the subdivision of the storage area into two zones 10′ and 10″ and the arrangement of the auxiliary stem 3, such that it floats between the zones, one storage zone will be located before and one behind the auxiliary stem and they will vary in a telescopic fashion during the charging and discharging operations caused by the displacement of the tool holder 4 relative to the receiver 2. The total displacement volume of the storage zones 10′ and 10″ is selected to maintain an even extrusion velocity during the charging time at which the piston 1 moves in the feed bore 5. Because of the floating stem arrangement cyclically changing specific pressures are produced so that a most favorable arrangement of release and throttle points in the straight feed of the extrusion material is obtained.

Figure 2:
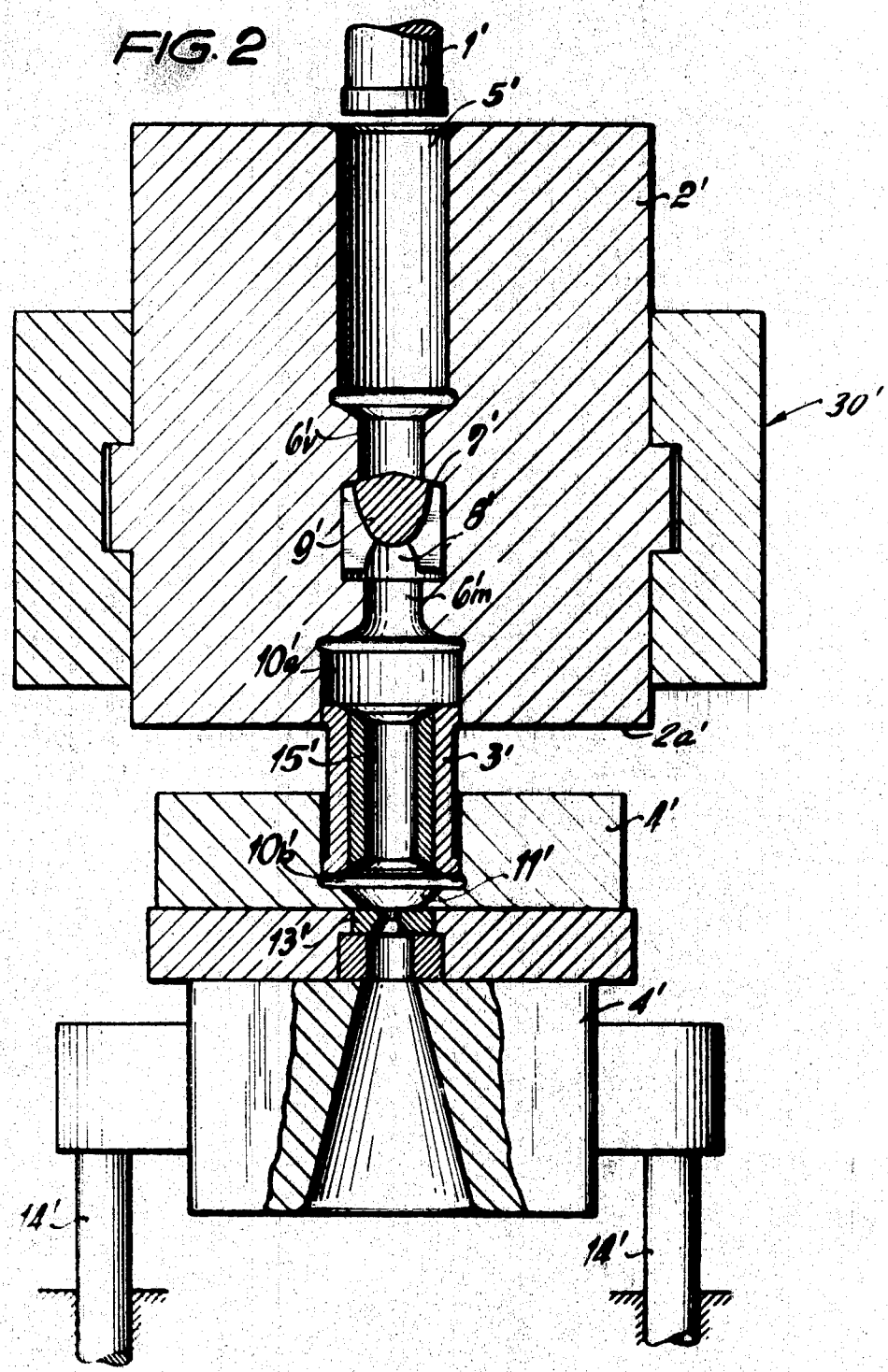
FIG. 2 is a view similar to FIG. 1 of another embodiment of the invention.

In the embodiment indicated in FIG. 2, there is shown an extrusion press generally designated 30′ which includes similar parts which are similarly designated. In this embodiment, material which is directed out of the storage zone 10b′ is directed to an extrusion chamber 11′ which is aligned vertically with a shaping tool 13′ carried on a holder 4′ which is moved by a drive 14′. The operation of the press 30′ in which the extrusion product is directed in a straight line is substantially the same as that of the embodiment of the press 30 indicated in FIG. 1 in which the extrusion product is directed transversely to the extrusion feed direction.

While specific embodiments of the invention have been shown and described in detail to illustrate the application of the inventive principles, it will be understood that the invention may be embodied otherwise without departing from such principles.

What is claimed is:

1. An extrusion press, particularly a cable sheathing press, comprising a feed receiver having a feed bore, a main stem reciprocable in said feed bore, a valve chamber having valve means therein, a first passage of smaller flow area than said feed bore interconnecting said feed bore and said valve chamber, said receiver defining a first storage chamber, a second passage of smaller flow area than said first storage passage interconnecting said valve chamber and said first storage chamber, a holder having a bore defining a second storage chamber in alignment with said first storage chamber, said holder also defining an interior extrusion chamber connected to said second storage chamber, means for moving said receiver and said holder relatively toward and away from each other, and an auxiliary stem having a bore defined therethrough for the passage of extrusion material and communicating at the respective opposite ends thereof with said first and second storage chambers, respectively, said auxiliary stem having its respective opposite ends guided in said first and second chambers, respectively, and being floatably movable in said first and second storage chambers upon relative movement of said receiver and said holder.

2. An extrusion press according to claim 1, wherein said extrusion chamber extends transversely to said feed passage means and said storage chamber.

3. An extrusion press according to claim 1, wherein said extrusion chamber is in substantial alignment with said feed passage means and said first and second storage chambers.

4. An extrusion press according to claim 1, wherein said extrusion chamber comprises an annular chamber, a hollow mandrel positioned in said annular chamber and having a bore therethrough for the movement of cable therethrough into said annular chamber, and a matrix having a bore aligned with the bore of said mandrel but being of a larger diameter to receive extrusion material therethrough for forming a sheathing of a cable passed through said mandrel.

5. An extrusion press according to claim 1, including a forming tool in alignment with said extrusion chamber, said extrusion chamber being in alignment with said first and second storage chambers.

6. An extrusion press according to claim 1, wherein said holder includes a transverse bore defining said extrusion chamber and a cavity for receiving a mandrel, a mandrel positioned in said cavity and defining the interior wall of said extrusion chamber.

References Cited

UNITED STATES PATENTS

| | | | |
|---|---|---|---|
| 3,224,240 | 12/1965 | Müller | 72—270 |
| 3,203,216 | 8/1965 | Müller | 72—258 |
| 2,131,173 | 9/1938 | Greenall | 72—258 |
| 89,326 | 8/1869 | Merrie | 72—258 |
| 3,021,004 | 2/1962 | Erbslöh | 72—258 |

FOREIGN PATENTS 969,903   4/1954   Germany.

CHARLES W. LANHAM, Primary Examiner

A. L. HAVIS, Assistant Examiner

U.S. Cl. X.R.

72—258, 271